(12) United States Patent
Killebrew et al.

(10) Patent No.: US 11,170,469 B2
(45) Date of Patent: Nov. 9, 2021

(54) IMAGE TRANSFORMATION FOR MACHINE LEARNING

(71) Applicant: Google LLC, Mountain View, CA (US)

(72) Inventors: Carrell Daniel Killebrew, Sunnyvale, CA (US); Ravi Narayanaswami, San Jose, CA (US); Dong Hyuk Woo, San Jose, CA (US)

(73) Assignee: Google LLC, Mountain View, CA (US)

( * ) Notice: Subject to any disclaimer, the term of this patent is extended or adjusted under 35 U.S.C. 154(b) by 59 days.

(21) Appl. No.: 16/531,876

(22) Filed: Aug. 5, 2019

(65) Prior Publication Data

US 2020/0027195 A1     Jan. 23, 2020

Related U.S. Application Data

(63) Continuation of application No. 15/885,178, filed on Jan. 31, 2018, now Pat. No. 10,373,291.

(51) Int. Cl.
*G06T 3/40* (2006.01)
*G06T 1/60* (2006.01)
*G06N 20/00* (2019.01)

(52) U.S. Cl.
CPC ........... *G06T 3/4007* (2013.01); *G06N 20/00* (2019.01); *G06T 1/60* (2013.01)

(58) Field of Classification Search
None
See application file for complete search history.

(56) References Cited

U.S. PATENT DOCUMENTS

| 4,942,621 A | 1/1990 | Angwin |
| 5,193,126 A | 3/1993 | Matsuki |
| 5,428,725 A | 6/1995 | Sugai et al. |

(Continued)

FOREIGN PATENT DOCUMENTS

WO    WO2018236468     12/2018

OTHER PUBLICATIONS

EP Extended European Search Report in European Application No. 20182400, dated Oct. 5, 2020, 11 pages.

(Continued)

*Primary Examiner* — Jiangeng Sun
(74) *Attorney, Agent, or Firm* — Fish & Richardson P.C.

(57) ABSTRACT

Methods, systems, and apparatus, including an apparatus for determining pixel coordinates for image transformation and memory addresses for storing the transformed image data. In some implementations, a system includes a processing unit configured to perform machine learning computations for images using a machine learning model and pixel values for the images, a storage medium configured to store the pixel values for the images, and a memory address computation unit that includes one or more hardware processors. The processor(s) are configured to receive image data for an image and determine that the dimensions of the image do not match the dimensions of the machine learning model. In response, the processor(s) determine pixel coordinates for a transformed version of the input image and, for each of the pixel coordinates, memory address(es), in the storage medium, for storing pixel value(s) that will be used to generate an input to the machine learning model.

20 Claims, 5 Drawing Sheets

(56) References Cited

U.S. PATENT DOCUMENTS

| | | | |
|---|---|---|---|
| 5,745,739 | A | 4/1998 | Wang et al. |
| 5,870,077 | A | 2/1999 | Dillinger |
| 5,949,429 | A | 9/1999 | Bonneau et al. |
| 6,195,737 | B1 | 2/2001 | Hollister et al. |
| 6,667,745 | B1 | 12/2003 | Hussain |
| 6,930,688 | B1 | 8/2005 | Pether |
| 8,442,321 | B1 | 5/2013 | Chang |
| 10,373,291 | B1 | 8/2019 | Killebrew et al. |
| 2005/0168496 | A1 | 8/2005 | Doyen |
| 2010/0312731 | A1 | 12/2010 | Knoblauch |
| 2014/0147034 | A1 | 5/2014 | Ito |
| 2016/0055084 | A1* | 2/2016 | Rangaswami ............ G06F 3/06 711/141 |
| 2016/0078312 | A1* | 3/2016 | Kimura .............. G06K 9/00624 382/155 |
| 2016/0092779 | A1 | 3/2016 | Werth |
| 2016/0322042 | A1 | 11/2016 | Vlietinck |
| 2017/0004089 | A1* | 1/2017 | Clemons ............. G06F 12/0893 |

OTHER PUBLICATIONS

PCT International Preliminary Report on Patentability in International Application No. PCT/US2019/015770, dated Aug. 4, 2020, 9 pages.

'becominghuman.ai [online],' "Image data pre-processing for neural networks," Sep. 2017, [retrieved May 15, 2019], retrieved from: URL< https://becominghuman.ai/image-data-pre-processing-for-neural-networks-498289068258>, 6 pages.

'Kilgariff et al [online]', "NVIDIA Turing Architecture In-Depth," Sep. 2018, [retrieved May 15, 2019], retrieved from URL< https://devblogs.nvidia.com/nvidia-turing-architecture-in-depth/>, 30 pages.

Clemons et al, "A patch memory system for image processing and computer vision," IEEE, Oct. 2016, 13 pages.

PCT International Search Report and Written Opinion in International Appln. No. PCT/US2019/015770, dated May 10, 2019, 16 pages.

IN Office Action in Indian Application No. 202047031746, dated Aug. 17, 2021, 6 pages (with English translation).

* cited by examiner

IMAGE TRANSFORMATION FOR MACHINE LEARNING

CROSS-REFERENCE TO RELATED APPLICATIONS

This application is a continuation application of, and claims priority to, U.S. patent application Ser. No. 15/885,178, now U.S. Pat. No. 10,373,291, titled "IMAGE TRANSFORMATION FOR MACHINE LEARNING," filed on Jan. 31, 2018. The disclosure of the foregoing application is incorporated herein by reference in its entirety for all purposes.

BACKGROUND

Machine learning can be used to classify images. For example, a neural network can be used to classify an image based on visual features of the image. Neural networks are machine learning models that employ one or more layers to generate an output, e.g., a classification of an image, for a received input, e.g., features of an image. Some neural networks include one or more hidden layers in addition to an outer layer. The output of each hidden layer is used as input to the next layer in the network, i.e., the next hidden layer or the output layer of the network. Each layer of the network generates an output from a received input in accordance with current values of a respective set of parameters.

Some neural networks include one or more convolutional neural network layers. Each convolutional neural network layer has an associated set of kernels. Kernels can be represented as a matrix structure of weight inputs. Each convolutional layer uses the kernels to process inputs to the layer. A set of inputs to the layer can also be represented as a matrix structure.

A neural network is configured to receive images of a particular shape. However, some images that are to be classified using the neural network may have a different shape than the configured shape.

SUMMARY

This specification describes technologies relating to a special purpose computational unit that determines pixel coordinates for image transformation and memory addresses for storing the transformed image data.

In general, one innovative aspect of the subject matter described in this specification can be embodied in systems that include a processing unit configured to perform machine learning computations for images using a machine learning model and pixel values for the images. The machine learning model can be configured to process images having particular dimensions. The system can include a storage medium configured to store the pixel values for the images and a memory address computation unit that includes one or more hardware processors. The one or more hardware processors can be configured to receive image data for an image. The image data can specify dimensions of the image. The dimensions of the image can specify a horizontal pixel dimension and a vertical pixel dimension. The horizontal pixel dimension is a number of pixels along the horizontal dimension of the image and the vertical pixel dimension is a number of pixels along the vertical dimension of the image.

The one or more hardware processors can be configured to determine that the dimensions of the image do not match the particular dimensions and, in response to determining that the dimensions of the image do not match the particular dimensions, determine, based on the dimensions of the image and the particular dimensions, a horizontal pixel stride and a vertical pixel stride for the image and determine, using the horizontal pixel stride and the vertical pixel stride, pixel coordinates for a transformed version of the input image. Each pixel coordinate including a vertical coordinate and a horizontal coordinate.

For each of the pixel coordinates, the one or more hardware processors can be configured to determine one or more memory addresses, in the storage medium, for storing one or more pixel values that will be used to generate an input to the machine learning model for the pixel coordinate and output each memory address to the processing unit. The one or more memory address for each pixel coordinate being based on the vertical coordinate and the horizontal coordinate of the pixel coordinate.

These and other implementations can each optionally include one or more of the following features. In some aspects, the processing unit uses each memory address to access a pixel value stored at the memory address and performs a machine learning computation based on the pixel value stored at the memory address.

In some aspects, the memory computation unit includes one or more first hardware storage circuits for storing a current value of the horizontal coordinate and one or more second hardware storage circuits for storing a current value of the vertical coordinate. The one or more processors can determine the pixel coordinates for the image by determining an initial pixel coordinate that includes an initial horizontal coordinate and an initial vertical coordinate, storing the initial horizontal coordinate in the one or more first hardware storage circuits, storing the initial vertical coordinate in the one or more second hardware storage circuits, updating the current value of the horizontal coordinate for each iteration of a first loop used to traverse the horizontal pixel dimension of the image by adding the horizontal pixel stride to the current value of the horizontal coordinate after each iteration of the first loop, and updating the current value of the vertical coordinate for each iteration of a second loop used to traverse the vertical pixel dimension of the image by adding the vertical pixel stride to the current value of the vertical coordinate after each iteration of the first second loop.

In some aspects, the determined memory address for each pixel coordinate corresponds to a location in the storage medium for storing a pixel value for a nearest neighbor pixel for the pixel coordinate. The pixel value at each nearest neighbor pixel can be used by the processing unit as an input to the machine learning model.

In some aspects, determining the one or more memory addresses, in the storage medium, for storing the one or more pixel values that will be used to generate an input to the machine learning model for the pixel coordinate includes, for each iteration of the first loop or the second loop, identifying the current value of the horizontal coordinate stored in the one or more first hardware storage circuits, identifying the current value of the vertical coordinate stored in the one or more second hardware storage circuits, and determining the memory address for the pixel coordinate that corresponds to the current value of the horizontal coordinate and the current value of the vertical coordinate based on the current value of the horizontal coordinate and the current value of the vertical coordinate.

In some aspects, determining the memory address for the pixel coordinate that corresponds to the current value of the horizontal coordinate and the current value of the vertical coordinate includes determining a first partial address value based on a product of the current value of the horizontal coordinate and a first dimension multiplier, determining a second partial address value based on a product of the current value of the vertical coordinate and a second dimension multiplier, and determining the memory address for the pixel coordinate that corresponds to the current value of the horizontal coordinate and the current value of the vertical coordinate by determining a sum of the first partial address value and the second partial address value.

In some aspects, the memory address for the pixel coordinate that corresponds to the current value of the horizontal coordinate and the current value of the vertical coordinate equals the sum of the first partial address value, the second partial address value, and a base memory address. The first loop can be nested within the second loop or the second loop can be nested within the first loop.

In some aspects, determining the one or more memory addresses, in the storage medium, for storing the one or more pixel values that will be used to generate an input to the machine learning model for the pixel coordinate includes determining a respective memory address for each of four pixel coordinates for use in bilinear interpolation of a pixel value for the pixel coordinate. This can include, for each iteration of the first loop or the second loop, identifying the current value of the horizontal coordinate stored in the one or more first hardware storage circuits; identifying the current value of the vertical coordinate stored in the one or more second hardware storage circuits, identifying a vertical offset value; identifying a horizontal offset value, determining, for a first pixel coordinate of the four pixel coordinates, a first memory address for storing a first pixel value for the first pixel coordinate based on a sum of the current value of the horizontal coordinate and the current value of the vertical coordinate; determining, for a second pixel coordinate of the four pixel coordinates, a second memory address for storing a second pixel value the second pixel coordinate based on a sum of the current value of the horizontal coordinate, the current value of the vertical coordinate, and the vertical offset value; determining, for a third pixel coordinate of the four pixel coordinates, a third memory address for storing a third pixel value for the third pixel coordinate based on a sum of the current value of the horizontal coordinate, the current value of the vertical coordinate, and the horizontal offset value; and determining, for a fourth pixel coordinate of the four pixel coordinates, a fourth memory address for storing a fourth pixel value for the fourth pixel coordinate based on a sum of the current value of the horizontal coordinate, the current value of the vertical coordinate, the vertical offset value, and the horizontal offset value.

In some aspects, the vertical offset value is based at least on the number of horizontal pixels in the image and the horizontal offset value is equal to one. The one or more processors can determine a bilinear interpolation weight for each of the four pixel coordinates and output each weight to the processing unit. The processing unit can determine an input pixel value for the machine learning model using the pixel value at each of the four pixel coordinates and the weight for each of the four pixel coordinates. The weight for each of the four pixel coordinates can be based on a fractional portion of the horizontal coordinate of the pixel coordinate and a fractional portion of the vertical coordinate of the pixel coordinate.

In some aspects, the processing unit is configured to generate the input to the machine learning model by, for each of the pixel coordinates, determining one or more color values from the pixel values stored in the one or more memory addresses for the pixel coordinates and process the generated input using the machine learning model to generate a machine learning output.

The subject matter described in this specification can be implemented in particular embodiments so as to realize one or more of the following advantages. Determining pixel coordinates for transformed images and memory addresses for storing pixel values for the pixel coordinates by a machine learning processor reduces latency in performing machine learning computations for images that do not have the particular shape that the machine learning model is configured to process. For example, the machine learning processor can transform the image on chip without having to send the image back to another computing system for transformation. This also increases the processing throughput of the machine learning processor as the processor can continue processing image data without waiting for another computing system to perform the transformation.

A special purpose computational unit that can iterate over a deeply-nested loop with fewer instructions using simple arithmetic allows for the resizing if images with higher throughput and reduced latency. Registers of the computational unit can be used to track the pixel coordinates of the image and track the memory address values used to determine memory addresses for pixel data. Memory address values can be quickly determined by applying simple arithmetic calculations based on values stored in registers. Determining the memory addresses for pixel values (and optionally their corresponding weights) using simple arithmetic calculations and by a separate processor than the processing unit that performs the machine learning computations allows the number of computational cycles of the processing unit to be reduced, and increases bandwidth of the processing unit for more machine learning computations. Separating pixel coordinate values into integer and fractional portions allows the same fractional values to be used to determine the memory addresses for pixel values and the weights for bilinear interpolation. This allows for a reduction in the memory storage requirements of a machine learning processor, a reduction in the number of computations that are performed (e.g., no separate computations of the distances between pixels for determining the weights), and a reduction in the number of instructions needed to determine the weights which further reduces the memory storage requirements.

Other implementations of this and other aspects include corresponding systems, methods, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
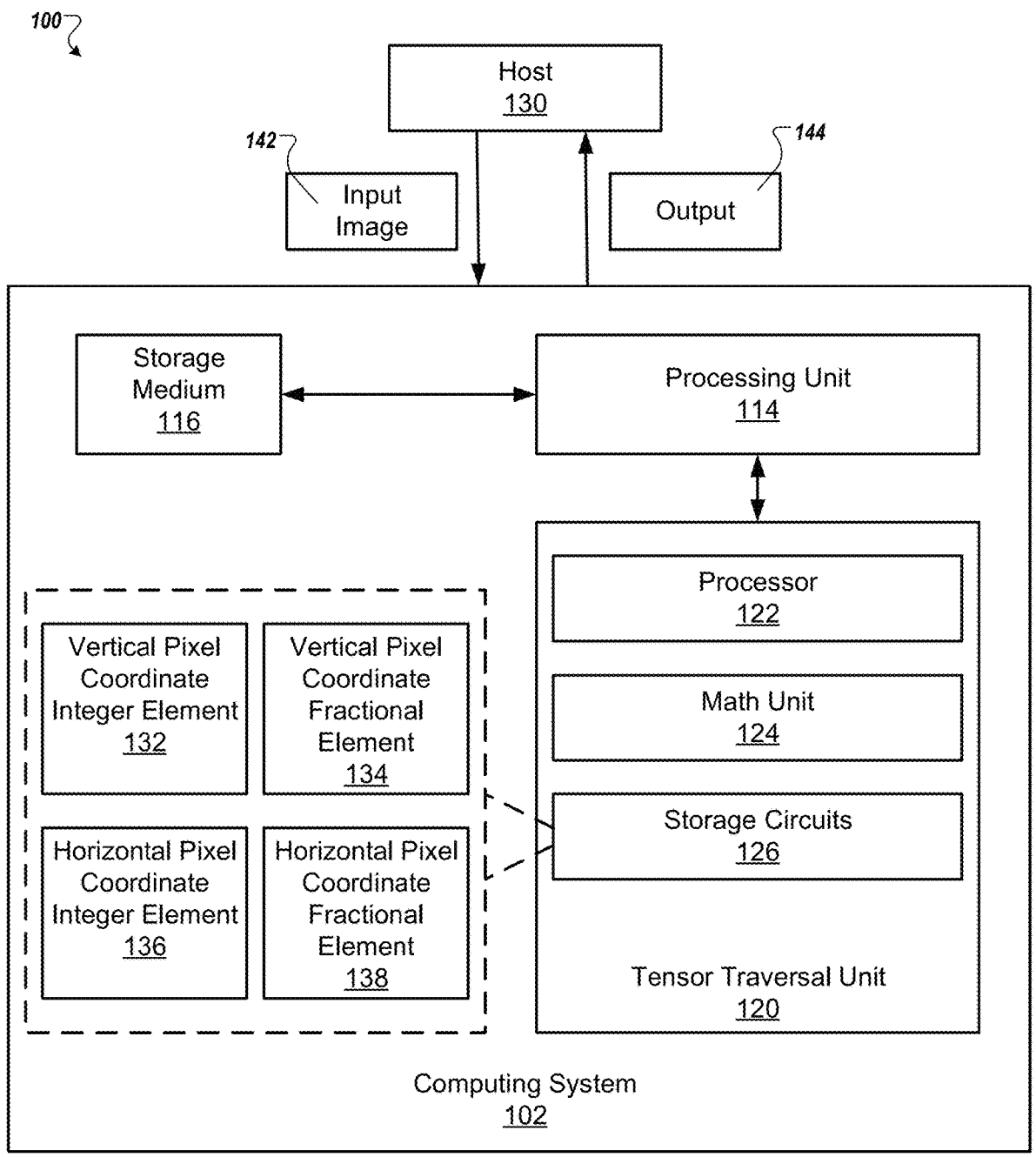
FIG. 1 is a block diagram of an example computation system.

In general, a loop nest may be used to process an N-dimensional regular array, hereinafter referred to as a "tensor." Each loop can be responsible for traversing a respective dimension of the N-dimensional tensor. A multi-dimensional tensor may be a matrix or a multi-dimensional matrix. For example, a 2-dimensional tensor is a matrix, while a 3-dimensional tensor is a three-dimensional matrix made up of multiple two-dimensional matrices. Each dimension of the N-dimensional tensor may include one or more elements, where each element may store a respective data value. For example, a tensor may be a variable in a program, where the variable may have three dimensions. The first dimension may have a length of three hundred elements, the second dimension may have a length of a thousand elements, and the third dimension may have a length of twenty elements. Of course, other numbers of elements in each dimension are possible.

Traversing the tensor in a nested loop can include a computation of a memory address value of an element to load or store the corresponding data value of the element. A for-loop is an example of a loop nest, where three loops tracked by three loop index variables (e.g., i, j, and k) can be nested to traverse through a three-dimensional tensor. In a neural network, a value of an element may be used in one or more dot product computations associated with the tensor. For example, the value of the element may be multiplied with a corresponding parameter or weight. The elements of the tensor may be traversed in order using nested for-loops to access the element and perform one or more computations using the value of the element. Continuing the three dimensional tensor example, an outer for-loop may be used to traverse the loop tracked by variable i, a middle for-loop loop may be used to traverse the loop tracked by variable j, and an inner for-loop may be used to traverse the loop tracked by variable k. In this example, the first element accessed may be (i=0, j=0, k=0), the second element may be (i=0, j=0, k=1), and so on. As described below, a tensor traversal unit can be used to determine the memory address for each element in order using nested loops so that a processing unit can access the value of the element and perform the one or more computations using the value of the element.

In some cases, a processor may need to execute a loop bound condition, such as setting a loop bound of an inner loop with an outer loop index variable. For example, in determining whether to exit the inner-most loop of a nested loop, the program may compare the current value of the loop index variable of the inner-most loop with the current value of the loop index variable of the outer-most loop of the nested loop.

These tasks may require a significant number of instructions such as branch instructions and integer arithmetic instructions. When each loop bound is small and the number of loop iterations is large, the computation may take a significant portion of the overall execution time, and seriously degrade overall performance. A hardware tensor traversal unit for a processor may increase the computation bandwidth of the processor by performing all loop traversal and address generation, freeing the mathematical units of the processor to do other work such as performing machine learning computations.

A tensor can include image values for an image, e.g., color values for pixels of an image being processed by a neural network or other machine learning model. For example, the machine learning model may be configured to process the image to classify the image as depicting an object from one or more object classes. As another example, the machine learning model may be configured to process the image to identify locations in the image that depict an object. As yet another example, the machine learning model may be configured to process the image to generate a numeric representation of the image, e.g., a vector of numeric values that conveys information about the contents of the image. The image values can include one or more values for the pixels of the image. A value for a pixel is referred to herein as a pixel value and can include a value that represents a color of the pixel (e.g., a greyscale value or a red, green, or blue (RGB) value). For RGB colors, the tensor can include, for each pixel, a red value, a green value, and a blue value.

As discussed above, a neural network may be configured to receive images of a particular shape, e.g., images that have particular horizontal and vertical dimensions. For images that have a shape that does not match the expected input shape, the images need to be modified so that they have the expected input shape before they can be processed by the neural network.

The tensor traversal unit can determine pixel coordinates for use in an image transformation process that converts the image to the expected input shape. The tensor traversal unit also computes one or more memory address values for each pixel of the transformed image so that a processing unit that performs the machine learning computations can access or store the corresponding pixel data for the pixel coordinates. Absent the ability to determine the appropriate pixel coordinates, the tensor traversal unit would have to send the image data back to the processing unit or another computing system to perform the image transformation prior to computing the memory address values. With these features, the processing latency associated with sending the image data back to the host is reduced and the computational throughput of the tensor traversal unit and the processing unit is increased. The flexibility of the tensor traversal unit is also increased.

FIG. 1 is a block diagram of an example computation system 102. In general, the computing system 100 processes an input image 132 received from a host 130 to generate an output 134 that is provided to the host 130. The computing system 100 may be configured to perform linear algebra computations. For example, the computing system 100 may be configured to perform machine learning computations using a machine learning model, e.g., a neural network.

The computing system 100 includes a processing unit 114, a storage medium 116, and a tensor traversal unit 120. The processing unit 102 may include one or more processors that perform the computations on image data for the input images 142 to generate the output 144. The output 144 may be a classification or other output characterizing an input image 142, e.g., classifying the input image as including an image of an object belonging to one or more categories, based on the image data and the machine learning model.

The output 144 can be to another computing system, e.g., a user device, in response to a received request.

The storage medium 104 stores information within the computing system 100. In some implementations, the storage medium 104 is a volatile memory unit or units. In some other implementations, the storage medium 104 is a non-volatile memory unit or units. The storage medium 104 may also be another form of computer-readable medium, such as a floppy disk device, a hard disk device, an optical disk device, or a tape device, a flash memory or other similar solid state memory device, or an array of devices, including devices in a storage area network or other configurations.

The tensor traversal unit 120 can be implemented as an application-specific integrated circuit. The tensor traversal unit 120, which is also referred to herein as a memory address computation unit, can include one or more processors 122 that are configured to determine memory addresses for storing image data. The tensor traversal unit 120 also includes a math unit 124 and storage circuits 126. The math unit 124 can include one or more arithmetic logic units (ALUs) and/or one or more adders. For example, the math unit 124 can include one or more hardware ALUs and/or one or more hardware adders. The math unit 124 is configured to determine the memory addresses for storing the image data. The storage circuits 126 include hardware memory storage, e.g., registers.

In some implementations, the tensor traversal unit 120 translates pixel coordinates for an image into memory addresses for storing pixel values in the storage medium 116. For example, the tensor traversal unit 120 can translate a set of pixel coordinates into a one-dimensional address space. The pixel coordinate for a pixel of an image can include a vertical coordinate and a horizontal coordinate. The tensor traversal unit 120 can perform the translations by making a memory address a combination (e.g., a linear combination) of the vertical coordinate and the horizontal coordinate of the pixel coordinate. As described above, a pixel value can include a value that represents a color of the pixel (e.g., a greyscale value or an RGB value for the pixel).

The tensor traversal unit 120 can determine, for each pixel coordinate, one or more memory addresses for the color value(s) that represents the color of the pixel. For example, if the image is represented using greyscale values, the tensor traversal unit can determine, for each pixel, a single memory address for storing the greyscale value for the pixel. If the image is represented using RGB values, the tensor traversal unit can determine, for each pixel, a single memory address for storing all three color values. In this example, each memory address may refer to a four-byte memory location and one byte may be used for each color value with an extra byte that is ignored. In some implementations in which RGB color values are used, the tensor traversal unit 120 can determine, for each pixel, a first memory address for storing the red value for the pixel, a second memory address for storing the green value for the pixel, and a third memory address for storing the blue value for the pixel.

The tensor traversal unit 120 can also determine pixel coordinates for an image transformation process that transforms an image to the particular dimensions of the machine learning model used by the processing unit 114 to process the image. For example, an image that is larger than the particular dimensions can be downscaled to the particular dimensions. Similarly, an image that is smaller than the particular dimensions can be upscaled to the particular dimensions.

The tensor traversal unit 120 can determine pixel coordinates for upscaling or downscaling using nearest neighbor and/or bilinear interpolation techniques. For both techniques, the tensor traversal unit 120 can determine a pixel coordinate for each pixel of the transformed image, i.e., the image that will be processed by the machine learning model. A pixel of a transformed image is referred to herein as a transformed pixel.

The tensor traversal unit can be switched between modes in which nearest neighbor interpolation is used and a mode in which bilinear interpolation is used to transform images. For example, a user can select either nearest neighbor or bilinear interpolation using a user interface of the computing system 102. The processing unit 114 can receive data specifying the selection and provide the data to the tensor traversal unit 120. In response, the tensor traversal unit 120 can use the selected transformation technique.

For each transformed pixel, the tensor traversal unit 120 can determine one or more memory addresses in the storage medium 116 for storing pixel value(s). When nearest neighbor interpolation is being used, the tensor traversal unit 120 can determine, for each transformed pixel, a memory address for storing the pixel value(s) for the pixel in the input image 142 that is closest to the location of the pixel coordinate of the transformed pixel. For example, the tensor traversal unit 120 can determine, for the closest pixel to the location of the pixel coordinate, a memory address for storing the one or more color values used to represent the color of the closest pixel.

When bilinear interpolation implementation is being used, the tensor traversal unit 120 can determine memory addresses for four pixels that are closest to the location of the pixel coordinate in the input image 142. For example, the tensor traversal unit 120 can determine, for each of the four pixels, a respective memory address for storing the one or more color values used to represent the color of the pixel.

The tensor traversal unit 120 can output the memory addresses to the processing unit 114. The processing unit 120 can access the pixel values stored at the memory addresses and perform machine learning computations using the pixel values, e.g., to classify the input image 142. When bilinear interpolation is being used, the processing 120 unit can access the four pixel values for each color value (e.g., red, green, or blue value) and determine, for each color value, a value that represents the color of the transformed pixel, as described below. The processing unit 120 can then perform machine learning computations using the color value(s) for each transformed pixel to generate a machine learning output, e.g., the output 144. The processing unit 120 can then provide the machine learning output 144 off-chip, e.g., to a user device, in response to a request to classify the input image 142.

Absent the tensor traversal unit's ability to determine the pixel coordinates, the tensor traversal unit 120 would have to send images that do not have the particular dimensions for the machine learning model back to the processing unit 114 or the host 130 for transformation. The ability to determine the pixel coordinates and memory addresses, reduces latency in performing the machine learning computations and increases the processing throughput of the computing system 102 (e.g., the processing throughout of the tensor traversal unit 120 and/or the processing unit 114.

The tensor traversal unit 120 can determine the pixel coordinates and the memory addresses for the pixel coordinates using a loop nest. The loop nest can include a first loop for traversing the horizontal pixel dimension of the image and a second loop for traversing the vertical pixel dimension of the image. For each iteration of the first loop, the tensor traversal unit 120 determines an updated horizontal coordinate. For each iteration of the second loop, the tensor traversal unit 120 determines an updated vertical coordinate. The first loop can be nested within the second loop or the second loop can be nested within the first loop.

To determine the pixel coordinates of the transformed pixels, the tensor traversal unit 120 can determine initial pixel coordinates within the input image 142 for an initial transformed pixel. For example, this initial transformed pixel may be the top left pixel in the transformed image. In this example, the coordinate of the top left corner of the input image may be (x=0, y=0) and the coordinate for the bottom right corner of the image may be (x=total number of horizontal pixels in the image, y=total number of vertical pixels in the image), where x is the horizontal dimension and y is the vertical dimension. The pixel coordinate of the initial transformed pixel within the input image may be at (x=0.375, y=0.375), depending on the relative size of the input image and the transformed image.

For the purpose of this example, consider the second loop is the outer loop and the first loop is the inner loop to traverse the image in a y major, x minor order and in order from the top left corner to the bottom right corner. Thus, the image is traversed one horizontal row of pixels at a time starting at the top row of the image and ending at the bottom right corner of the image.

For each iteration of the first loop, the tensor traversal unit 120 can update the horizontal coordinate, e.g., by adding the value of a horizontal stride to the previous value of the horizontal coordinate. For example, the initial pixel coordinate may be (0.375, 0.375) and the horizontal stride may be 1.375. In this example, the second pixel coordinate would be (1.75, 0.375) by adding the value of the horizontal stride (1.375) to the previous horizontal coordinate. The tensor traversal unit 120 can traverse the horizontal dimension of the input image 142 by adding the value of the horizontal stride to the previous horizontal coordinate until a loop bound condition for the first loop is reached, e.g., until the tensor traversal 120 reaches the end of the row for the image. Each time the loop condition for the first loop is reached, the tensor traversal unit 120 can reset the horizontal coordinate to its initial value (0.375) and update the vertical pixel coordinate by adding the value of the vertical stride to the previous vertical coordinate to being traversing the next row of the image. In this example, the first pixel coordinate in the second row would be (0.375, 1.75). The tensor traversal 120 can continue this process until the loop bound for the second loop is reached, e.g., until a pixel coordinate has been determined for each transformed pixel of the transformed image.

For each pixel coordinate determined, the tensor traversal unit 120 can determine one or more memory addresses for storing pixel value(s) for the pixel coordinate. In a nearest neighbor implementation, the tensor traversal unit 120 can determine a memory address for storing the pixel value for each transformed pixel's nearest neighbor pixel. In a bilinear interpolation implementation, the tensor traversal unit 120 can determine four memory addresses for each transformed pixel coordinate, one for each of the pixel values used to determine the pixel value for the transformed pixel coordinate.

As shown in the example above, pixel coordinates for a transformed pixel may have fractional components. The tensor traversal unit 120 can use fixed-point numbers to represent the pixel coordinate values. In some implementations, the tensor traversal unit 120 stores the integer values of the pixel coordinates separate from the fractional portions of the pixel coordinates. For example, as shown in FIG. 1, the tensor traversal unit 120 includes a vertical pixel coordinate integer element 132 that stores the integer portion of the vertical pixel coordinate and a vertical pixel coordinate fractional element 134 that stores the fractional portion of the vertical pixel coordinate. Similarly, the tensor traversal unit 120 includes a horizontal pixel coordinate integer element 136 that stores the integer portion of the horizontal pixel coordinate and a horizontal pixel coordinate fractional element 138 that stores the fractional portion of the horizontal pixel coordinate. Each element 132-138 can include a register or other storage circuitry.

The integer and fractional portions of the vertical stride and the horizontal stride can also be stored separately, e.g., in respective registers or other storage circuitry. When the tensor traversal unit 120 updates the vertical coordinate, the tensor traversal unit can add the integer portion of the vertical stride to the integer portion of the vertical coordinate and add the fractional portion of the vertical stride to the fractional portion of the vertical coordinate. Whenever this update results in the fractional portion of the vertical coordinate being equal to or greater than one, the tensor traversal unit 120 can add a value of one to the integer portion of the vertical coordinate and subtract a value of one from the fractional portion of the vertical coordinate to keep the fractional portion of the vertical coordinate less than one.

Similarly, when the tensor traversal unit 120 updates the horizontal coordinate, the tensor traversal unit can add the integer portion of the horizontal stride to the integer portion of the horizontal coordinate and add the fractional portion of the horizontal stride to the fractional portion of the horizontal coordinate. Whenever this update results in the fractional portion of the horizontal coordinate being equal to or greater than one, the tensor traversal unit 120 can add a value of one to the integer portion of the horizontal coordinate and subtract a value of one from the fractional portion of the horizontal coordinate to keep the fractional portion of the horizontal coordinate less than one.

Figure 2:
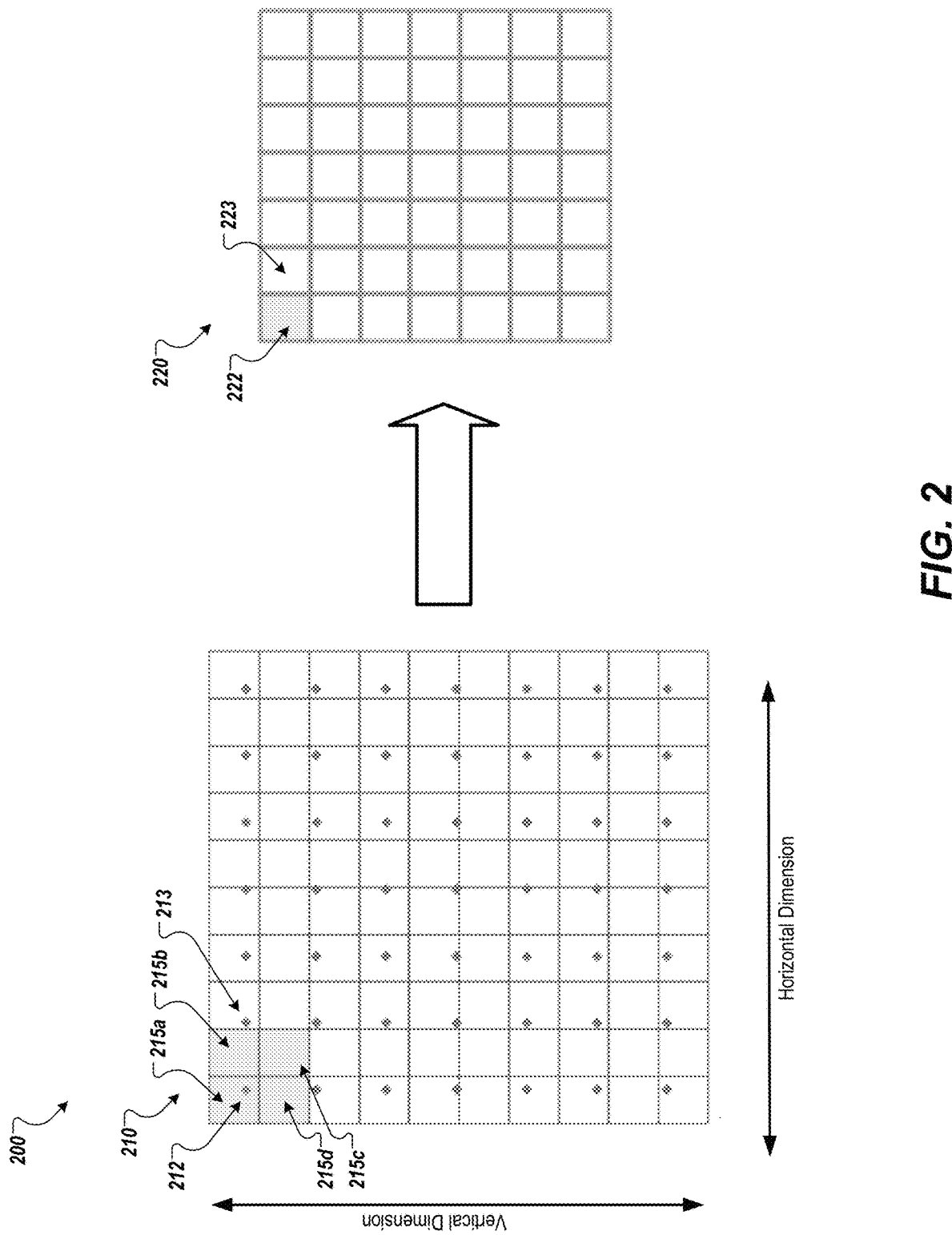
FIG. 2 is a diagram that illustrates bilinear interpolation for an image.

FIG. 2 is a diagram 200 that illustrates bilinear interpolation for an image. The diagram 200 includes a pixel layout 210 for an input image and a pixel layout 220 for a transformed version of the input image ("transformed image"). Each square in each layout 200 and 210 represents a pixel. In this example, the input image has a horizontal pixel dimension of 10 pixels and a vertical pixel dimension of 10 pixels. Similarly, the transformed image has a horizontal pixel dimension of 7 pixels and a vertical pixel dimension of 7 pixels. For example, the machine learning model may be configured to process images with a horizontal pixel dimension of 7 pixels and a vertical pixel dimension of 7 pixels.

To transform the input image, a set of pixel coordinates within the input image is identified for each pixel of the transformed image. For example, the pixel coordinates at point 212 have been identified for the top left pixel 222 of the transformed image. Similarly, the pixel coordinates at point 213 have been identified for the pixel 223 to the right of the pixel 222.

To determine the pixel value for each pixel of the transformed image, the four pixels closest to the pixel coordinates for the pixel are identified as source pixels. For the pixel 222, the four pixels closest to the pixel coordinates 212 are pixels 215a, 215b, 215c, and 215d. The pixel value for the pixel 221 can be a weighted combination of the pixel values for the source pixels 215a-215d. The weight for each source pixel can be based on the distance of the source pixel from the pixel coordinates of point 212. For example, the pixel value for a source pixel that is closer to the point 212 can be weighted more than the pixel value for a source pixel farther from the point 212. In this example, the pixel value for the source pixel 215a would be assigned a higher weight than the pixel value for the source pixel 215c. Example techniques for determining the pixel coordinates for the transformed image, the four source pixels for each pixel of the transformed image, and the weights for the pixel value of each source pixel are described below.

Figure 3:
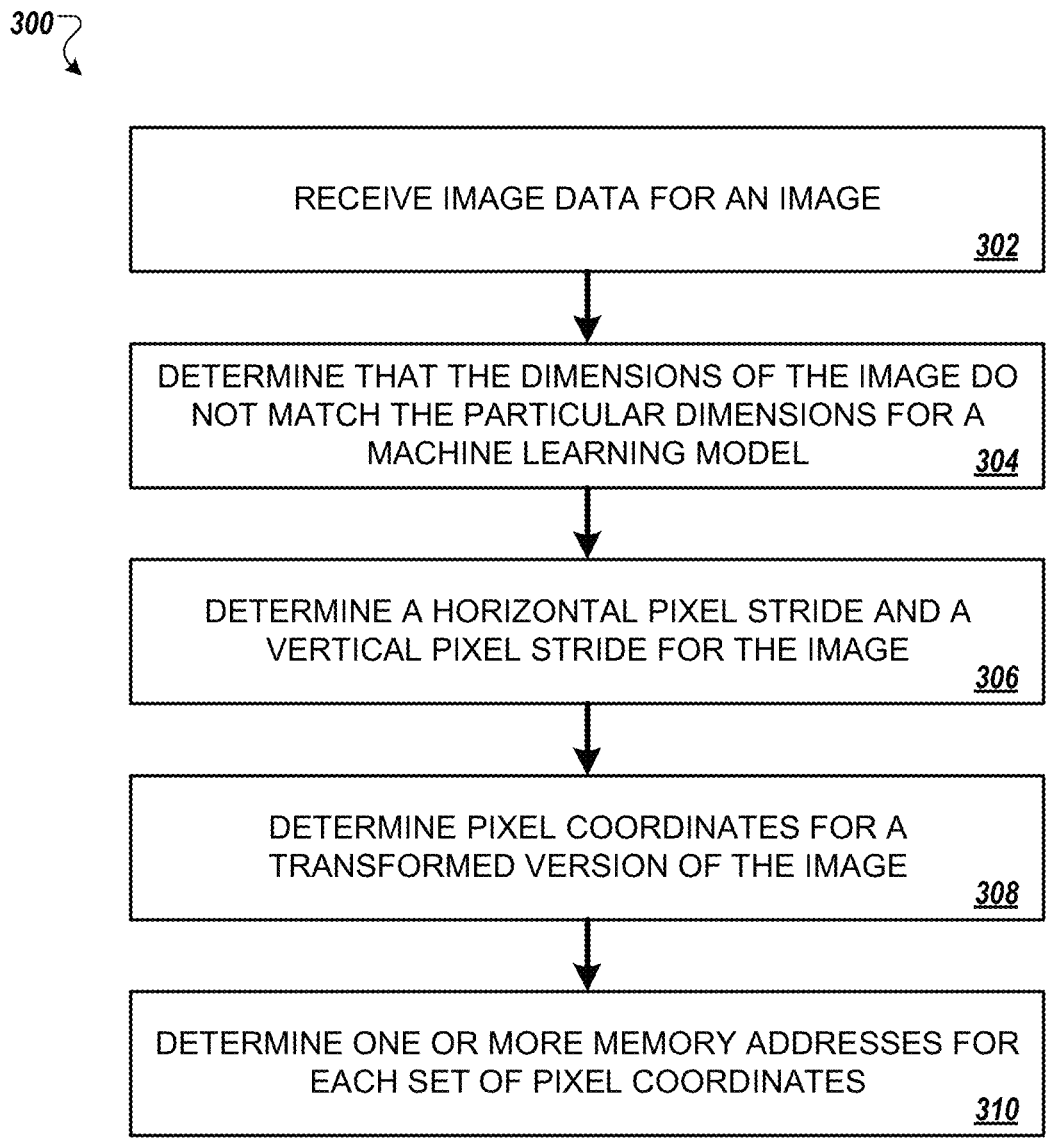
FIG. 3 is a flow diagram that illustrates an example process for determining memory addresses for image data.

FIG. 3 is a flow diagram that illustrates an example process 300 for determining memory addresses for image data. The process 300 may be performed by a system of one or more computers, e.g., the computing system 102 of FIG. 1. The system includes a tensor traversal unit, e.g., the tensor traversal unit 120 of FIG. 1.

The system receives image data for an image (302). For example, the tensor traversal unit can receive the image data. The image data can specify dimensions of the image. The dimensions of the image can specify a horizontal pixel dimension and a vertical pixel dimension. The horizontal pixel dimension is a number of pixels along the horizontal dimension of the image. The vertical pixel dimension is a number of pixels along the vertical dimension of the image. For example, an image that is 500 pixels tall by 400 pixels wide would have a vertical pixel dimension of 500 and a horizontal pixel dimension of 400.

The system determines that the dimensions of the image do not match the particular dimensions of a machine learning model (304). For example, the machine learning model may be configured to process (e.g., classify) images having particular dimensions. The particular dimensions can specify a particular vertical pixel dimension and a particular horizontal pixel dimension. The tensor traversal unit can compare the dimensions of the image to the particular dimensions of the machine learning model. If the vertical pixel dimension of the image does not match the particular vertical pixel dimension of the machine learning model or if the horizontal pixel dimension of the image does not match the particular horizontal pixel dimension of the machine learning model, the tensor traversal unit can determine that the dimensions of the image do not match the particular dimensions of a machine learning model.

The system determines a horizontal pixel stride and a vertical pixel stride for the image (306). The horizontal pixel stride and the vertical pixel stride are used to identify pixel coordinates within the image for each transformed pixel of the transformed version of the image.

The tensor traversal unit can determine the horizontal pixel stride and the vertical pixel stride based on the dimensions of the image and the particular dimensions of the machine learning model. In some implementations, the strides are determined using relationships 1 and 2 below:

$$\text{Horizontal Pixel Stride} = \frac{(\text{horizontal pixel dimension of image} + 1)}{(\text{particular horizontal pixel dimension of } ML \text{ model} + 1)} \quad (1)$$

$$\text{Vertical Pixel Stride} = \frac{(\text{horizontal pixel dimension of image} + 1)}{(\text{particular vertical dimension of } ML \text{ model} + 1)} \quad (2)$$

In some implementations, the tensor traversal unit stores the horizontal stride and the vertical stride in respective storage circuits, e.g., registers, of the tensor traversal unit. As described above, the strides may be stored as fixed-point numbers and the integer portion of each stride may be stored separate from the fractional portion of the stride. In this example, the fractional portions of the strides may be rounded to the nearest fixed-point number that can be represented using the number of bits used to store each stride. For example, if the dimensions of the image are 10×10 and the particular dimensions of the machine learning model are 7×7, the horizontal stride would be 1.375 and the vertical stride would be 1.375. The fractional portions (0.375) can be rounded to $48/128$ if the registers for storing the fractional portion are 7 bits or if the fixed-point number for the fractional portion includes 7 bits.

The system determines pixel coordinates for a transformed version of the image (308). The tensor traversal unit can use the horizontal and vertical pixel strides to determine the pixel coordinates. For example, as described above, the tensor traversal unit can use a loop nest to determine the pixel values by adding the stride values to current values of the pixel coordinates to determine the pixel coordinates. An example, process for using loops and strides to determine the pixel coordinates is illustrated in FIG. 4 and described on detail below.

The system determines one or more memory addresses for each identified pixel coordinate (310). The memory addresses for each pixel coordinate correspond to a location in a storage medium for storing one or more pixel values that will be used to generate an input to a machine learning model for the pixel coordinate. The tensor traversal unit can determine the memory address for a pixel coordinate based on the values of the vertical coordinate and the horizontal coordinate. Example techniques for determining the memory address(es) for each set of pixel coordinates are described below with reference to FIGS. 4 and 5.

Figure 4:
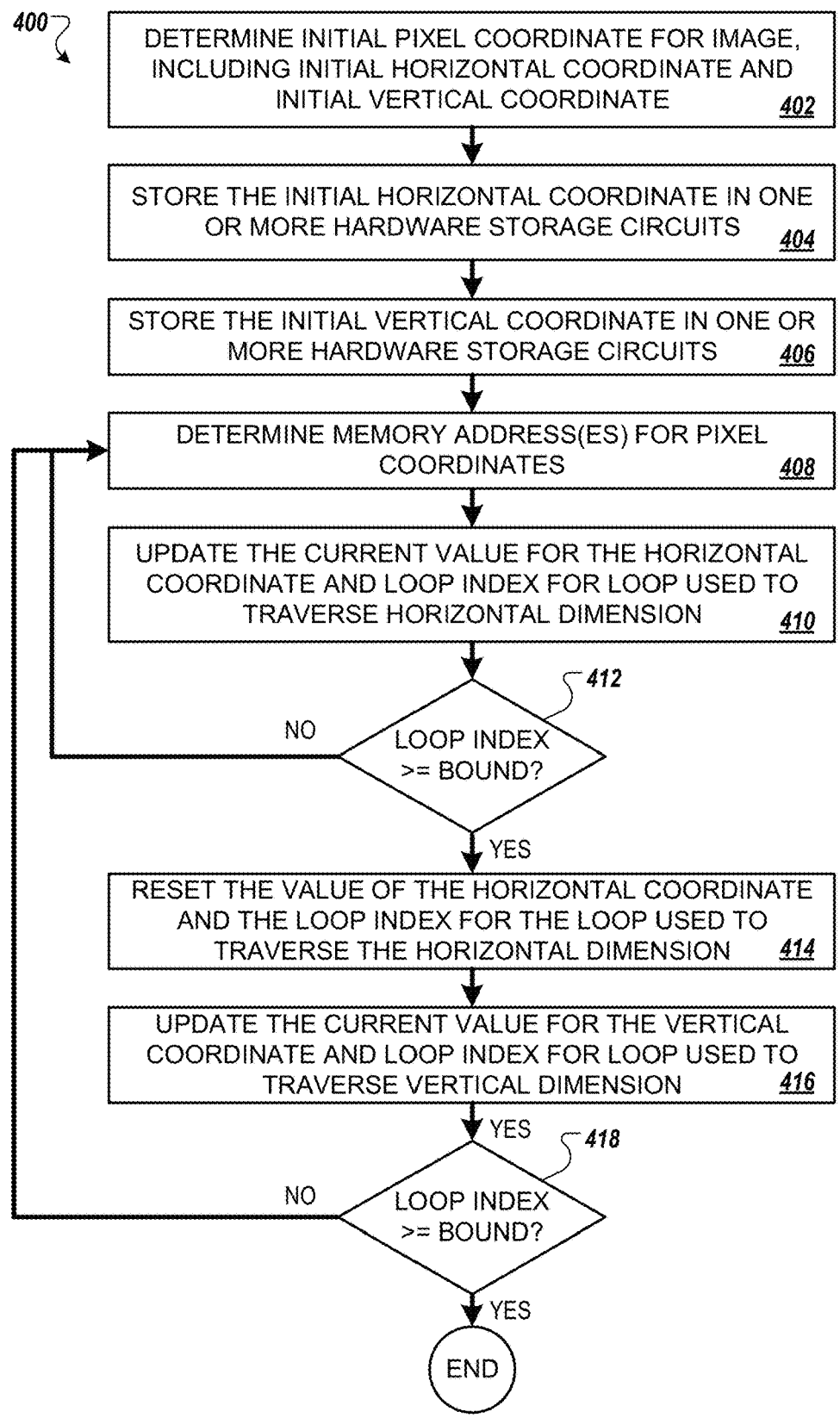
FIG. 4 is a flow diagram that illustrates another example process for determining memory addresses for image data.

FIG. 4 is a flow diagram that illustrates another example process 400 for determining memory addresses for image data. The process 400 may be performed by a system of one or more computers, e.g., the computing system 102 of FIG. 1. The system includes a tensor traversal unit, e.g., the tensor traversal unit 120 of FIG. 1.

The system determines an initial pixel coordinate for an input image (402). The initial pixel coordinate is a pixel coordinate within the image for a transformed pixel of a transformed version of the image. The initial pixel coordinate includes a horizontal coordinate along the horizontal dimension of the image and a vertical coordinate along the vertical dimension of the image. For example, the initial pixel coordinate can be near the top left of the image if the pixel coordinates for the transformed pixels are determined from left to right and top to bottom. In other examples, the initial pixel coordinate may be near the bottom right or another appropriate location within the image.

In some implementations, the tensor traversal unit determines the initial pixel coordinate based on the horizontal pixel stride and/or the vertical pixel stride. The tensor traversal can determine the horizontal pixel stride and the vertical pixel stride using relationships 1 and 2 above, respectively. The tensor traversal unit can determine the initial horizontal coordinate and the initial vertical coordinate using relationships 3 and 4 below:

Initial Horizontal Coordinate=Horizontal Pixel Stride−1 (3)

Initial Vertical Coordinate=Vertical Pixel Stride−1 (4)

The system stores the initial horizontal coordinate in one or more hardware storage circuits (404). The hardware storage circuits can be storage circuits, e.g., registers, of the tensor traversal unit. For example, the tensor traversal unit can store the integer portion of the initial horizontal coordinate a horizontal pixel coordinate integer element (e.g., the horizontal pixel coordinate integer element 136 of FIG. 1) and the fractional portion of the horizontal coordinate in a horizontal pixel coordinate fractional element (e.g., the horizontal pixel coordinate fractional element 138 of FIG. 1).

The system stores the initial vertical coordinate in one or more hardware storage circuits (406). The hardware storage circuits can be storage circuits, e.g., registers, of the tensor traversal unit. For example, the tensor traversal unit can store the integer portion of the initial vertical coordinate in a vertical pixel coordinate integer element (e.g., the vertical pixel coordinate integer element 132 of FIG. 1) and the fractional portion of the vertical coordinate in a vertical pixel coordinate fractional element (e.g., the vertical pixel coordinate fractional element 138 of FIG. 1).

The system determines one or more memory addresses for a pixel coordinate (406). For a first iteration, the tensor traversal unit can determine one or more memory addresses for the initial pixel coordinate. As described below, the pixel coordinate is updated for each iteration of loops used to traverse the horizontal and vertical dimensions of the image. For each updated pixel coordinate, the tensor traversal unit can determine one or more memory addresses.

Each memory address corresponds to a location in a storage medium for storing a pixel value. The memory addresses are used by a processing unit, e.g., the processing unit 114 of FIG. 1, to load or store a pixel value. For example, the processing unit may use the memory address for a pixel value to obtain the pixel value and generate an input for a machine learning model based on the pixel value. In a nearest neighbor implementation, the generated input may be the pixel value itself. In a bilinear interpolation implementation, the generated input may be a weighted combination of four pixel values.

In a nearest neighbor implementation, the memory address for a pixel coordinate corresponds to the location in the storage medium for storing the pixel value of the pixel within the input image that is closest to (e.g., the nearest neighbor to) the pixel coordinate. The memory address can be based on the vertical coordinate and the horizontal coordinate of pixel coordinate. For example, the tensor traversal unit can determine a first partial address value based on the horizontal coordinate and a second partial address value based on the vertical coordinate.

In some implementations, the first partial address value is based on the horizontal coordinate and the size of a third dimension (e.g., the z dimension). The third dimension can be based on the number of color values used to represent the color of a pixel. For example, if greyscale values are used, the size of the third dimension can be one. If RGB color values are used, the size of the third dimension can be one (e.g., if all three color values are stored at the same memory address) or three (e.g., if each color value is stored separately). As the horizontal coordinate may include a fractional portion, the value of the horizontal coordinate can be rounded. For example, the tensor traversal unit can round the horizontal coordinate using a round half towards zero technique in which values of 0.5 are rounded to zero. The first partial address value can be based on the product of the rounded horizontal coordinate and the size of the third dimension.

Similarly, the second partial address value can be based on the vertical coordinate and a product of the size of the horizontal dimension (e.g., number of pixels along the horizontal dimension of the image) and the size of the third dimension. As the vertical coordinate may also include a fractional portion, the value of the vertical coordinate can also be rounded, e.g., using the round half towards zero technique. The second partial address value can be based on the product of the rounded vertical coordinate and the product of the size of the horizontal dimension and the size of the third dimension. This ensures that each set of pixel coordinates is assigned a unique memory address.

The memory address for the pixel coordinate can be based on a sum of the first partial address value and the second partial address value. For example, the memory address can be equal to the sum of the first partial address value, the second partial address value, and a base address.

Figure 5:
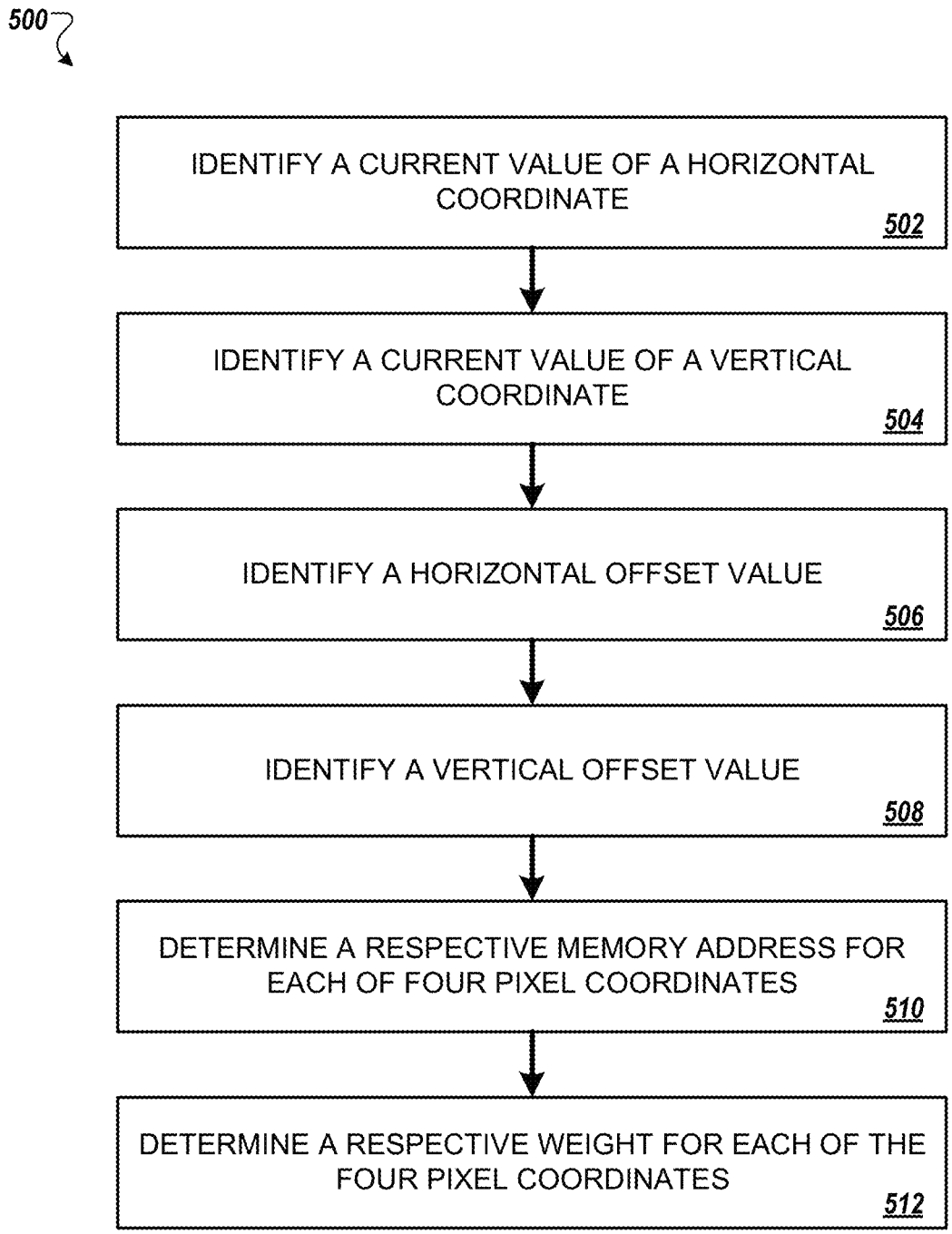
FIG. 5 is a flow diagram that illustrates an example process for determining memory addresses for image data and weights for bilinear interpolation.

In a bilinear interpolation implementation, the tensor traversal unit can determine four memory addresses based on the pixel coordinate. Each memory address corresponds to the location in the storage medium for storing the pixel value(s) of one of the four source pixels in the input image that is closest to the location of the pixel coordinate in the input image. For example, the four source pixels may include the lower-left pixel that is below and to the left of the location of the pixel coordinate, the lower-right pixel that is below and to the right of the location of the pixel coordinate, the upper-left pixel that is above and to the left of the location of the pixel coordinate, and the upper-right pixel that is above and to the right of the location of the pixel coordinate. An example process for determining the four memory addresses is illustrated in FIG. 5 and described below.

The system updates the current value of the horizontal coordinate and updates the loop index for the loop used to traverse the horizontal dimension of the image (410). In some implementations, to update the loop index, the system can iterate the loop index by adding a value of one to the previous value of the loop index. In some implementations, the horizontal coordinate is used as the loop index and is therefore updated when the horizontal coordinate is updated.

To update the horizontal coordinate, the tensor traversal unit can add the horizontal stride to the current value of the horizontal coordinate and store the updated value of the horizontal coordinate. For the first iteration of the loop, the tensor traversal unit adds the horizontal stride to the initial horizontal coordinate.

If the integer portion and the fractional portion of the horizontal coordinate are stored separately, the tensor traversal unit can add the integer portion of the horizontal pixel stride to the integer portion of the horizontal coordinate. Similarly, the tensor traversal unit can add the fractional portion of the horizontal pixel stride to the fractional portion of the horizontal coordinate. If this results in a fractional portion of the horizontal coordinate that is greater than or equal to one, the tensor traversal unit can add one to the integer portion of the horizontal coordinate and subtract one from the fractional portion of the horizontal coordinate so that the fractional portion remains less than one.

The system determines whether the loop index for the loop used to traverse the horizontal dimension of the image is greater than or equal to its bound (412). The bound can be based on the number of horizontal pixels in the transformed image. For example, if the particular dimensions of the machine learning model have a horizontal dimension of seven pixels, the loop may include seven iterations so that the coordinates and memory addresses for seven pixels in each horizontal row of the image are determined. For example, the loop index may begin at zero and the bound may be six. When the loop index reaches a value of six, the system can determine that the loop index equals its bound.

If the loop index for the loop used to traverse the horizontal dimension is not greater than or equal to its bound, the system returns to operation (408) and determines one or more memory addresses for the update pixel coordinate that includes the previous vertical coordinate and the updated horizontal coordinate. If the loop index for the loop used to traverse the horizontal dimension is greater than or equal to its bound, the system resets the value of the horizontal coordinate to the initial horizontal coordinate and resets the loop index for the loop used to traverse the horizontal dimension to its initial value (414).

The system updates the current value of the vertical coordinate and updates the loop index for the loop used to traverse the vertical dimension of the image (416). In some implementations, to update the loop index, the system can iterate the loop index by adding a value of one to the previous value of the loop index. In some implementations, the vertical coordinate is used as the loop index and is therefore updated when the vertical coordinate is updated.

To update the vertical coordinate, the tensor traversal unit can add the vertical stride to the current value of the vertical coordinate and store the updated value of the vertical coordinate. For the first iteration of the loop, the tensor traversal unit adds the vertical stride to the initial vertical coordinate.

If the integer portion and the fractional portion of the vertical coordinate are stored separately, the tensor traversal unit can add the integer portion of the vertical pixel stride to the integer portion of the vertical coordinate. Similarly, the tensor traversal unit can add the fractional portion of the vertical pixel stride to the fractional portion of the vertical coordinate. If this results in a fractional portion of the vertical coordinate that is greater than or equal to one, the tensor traversal unit can add one to the integer portion of the vertical coordinate and subtract one from the fractional portion of the vertical coordinate so that the fractional portion remains less than one.

The system determines whether the loop index for the loop used to traverse the vertical dimension of the image is greater than or equal to its bound (418). The bound can be based on the number of vertical pixels in the transformed image. For example, if the particular dimensions of the machine learning model have a vertical dimension of seven pixels, the loop may include seven iterations so that the coordinates and memory addresses for seven pixels in each vertical column of the image are determined. For example, the loop index may begin at zero and the bound may be six. When the loop index reaches a value of six, the system can determine that the loop index equals its bound.

If the loop index for the loop used to traverse the vertical dimension is not greater than or equal to its bound, the system returns to operation (408) and determines one or more memory addresses for the update pixel coordinate that includes the updated vertical coordinate and the reset horizontal coordinate (initial horizontal coordinate). This would begin the traversal of another row along the horizontal dimension of the image using the loop for the horizontal dimension.

If the loop index for the loop used to traverse the horizontal dimension is greater than or equal to its bound, the process 400 ends as one or more memory addresses have been determined for each transformed pixel of the transformed image.

The tensor traversal unit can output each memory address to the processing unit as the addresses are determined, e.g., in sequence. In some implementations, the tensor traversal unit can output the memory addresses after the memory address(es) for each transformed pixel have been determined. The processing unit can use the memory addresses to load or store the pixel values.

In this example, the loop used to traverse the horizontal dimension of the image is nested within the loop used to traverse the vertical dimension of the input image. The following loop nest can be used to determine the memory addresses for an input image:

```
for (coord_y = intitial_y; coord_y <= size_y − 1);
  coord_y += stride_y;
  second_partial_address_value = Round(coord_y) * size_xz;
  for (coord_x = initial_x; coord_x <= size_x − 1);
    coord_x += stride_x;
    first_partial_address_value = Round(coord_x) * size_z;
    memory_address = first_partial_address_value +
  second_partial_address_value.
```

In this example, initial_y is the initial vertical coordinate, coord_y is the current value of the vertical coordinate, and size_y is the number of pixels along the vertical dimension of the input image. Thus, the outer loop has a loop bound equal to one less than the number of pixels along the vertical dimension of the image and the loop index is the current value of the vertical coordinate. After each iteration of the outer loop, the current value of the vertical coordinate is updated by adding the vertical pixel stride to the current value of the vertical coordinate. In addition, the second partial address value (second_partial_address_value) is determined by rounding (e.g., using round half towards zero for nearest neighbor or floor function for bilinear interpolation) the current value of the vertical coordinate and multiplying the rounded value by the product of the size of the horizontal dimension of the image and the size of the third dimension.

Similarly, initial_x is the initial value of the horizontal coordinate, coord_x is the current value of the horizontal coordinate, and size_x is the number of pixels along the horizontal dimension of the image. Thus, the inner loop has a loop bound equal to one less than the number of pixels along the horizontal dimension of the image and the loop index is the current value of the horizontal coordinate. After each iteration of the inner loop, the current value of the horizontal coordinate is updated by adding the horizontal pixel stride to the current value of the horizontal coordinate. In addition, the first partial address value (first_partial_address_value) is determined by rounding (e.g., using round half towards zero for nearest neighbor or floor function that outputs the greatest integer that is less than or equal to the coordinate for bilinear interpolation) the current value of the horizontal coordinate and multiplying the rounded value by the size of the third dimension.

The memory address (memory_address) is also determined for the pixel coordinate for each iteration of the inner loop. For a nearest neighbor implementation, the memory address can equal a sum of the first partial address value, the second partial address value, and optionally a base address. For a bilinear interpolation implementation, vertical and horizontal offset value can be used to determine four memory addresses, as described below.

FIG. 5 is a flow diagram that illustrates an example process 500 for determining memory addresses for image data and weights for bilinear interpolation. The process 500 may be performed by a system of one or more computers, e.g., the computing system 102 of FIG. 1. The system includes a tensor traversal unit, e.g., the tensor traversal unit 120 of FIG. 1. The operations (or a portion thereof) of the process 500 can be sub-operations of operation 408 of FIG. 4 when bilinear interpolation is being used to transform an input image.

The system identifies a current value of a horizontal coordinate within an input image (502). For example, as described above, a loop can be used to traverse the horizontal dimension of an input image and determine update the horizontal coordinates of pixel coordinates for transformed pixels of a transformed version of the image. At each iteration of the loop, the current value of the horizontal coordinate can be updated, e.g., by adding a horizontal pixel stride to the previous value of the horizontal coordinate. The tensor traversal unit can maintain the current value of the horizontal coordinate in one or more hardware storage circuits.

The system identifies a current value of a vertical coordinate within the input image (504). For example, as described above, a loop can be used to traverse the vertical dimension of an input image and determine update the vertical coordinates of pixel coordinates for transformed pixels of a transformed version of the image. At each iteration of the loop, the current value of the vertical coordinate can be updated, e.g., by adding a vertical pixel stride to the previous value of the vertical coordinate. The tensor traversal unit can maintain the current value of the vertical coordinate in one or more hardware storage circuits.

The system identifies a horizontal offset value (506). In implementations in which the memory addresses are determined using a y-major, x-minor loop nest where the loop used to traverse the horizontal dimension of the input image is nested within the loop used to traverse the vertical dimension of the input image, the horizontal offset value can be based on the size of the third dimension (e.g., the number of color values used to represent each pixel) for the input image. For example, the horizontal offset value may be one.

The system identifies a vertical offset value (508). In implementations, in which the memory addresses are determined using a y-major, x-minor loop nest, the vertical offset value can be based on a combination of the size of the horizontal dimension and the size of the third dimension. For example, the vertical offset value can be based on a product of the number of pixels in the input image along the horizontal dimension.

If an x-major, y-minor loop nest is used, the horizontal offset value can be equal to the product of the size of the vertical dimension (e.g., the number of pixels along the vertical dimension of the input image) and the size of the third dimension. Similarly, the vertical offset value can be the size of the third dimension.

The system determines a respective memory address for each of four pixel coordinates (510). The four pixel coordinates correspond to four source pixels in the input image for which the pixels' values will be used to determine a pixel value for a transformed pixel in the transformed version of the image. The transformed pixel is the pixel in the transformed image that represents the pixel in the input image at the pixel coordinate defined by the current value of the horizontal coordinate and the current value of the vertical coordinate.

The four pixels can be the four pixels closest to the location of the pixel coordinate in the input image. For example, the four source pixels may include the lower-left pixel that is below and to the left of the location of the pixel coordinate, the lower-right pixel that is below and to the right of the location of the pixel coordinate, the upper-left pixel that is above and to the left of the location of the pixel coordinate, and the upper-right pixel that is above and to the right of the location of the pixel coordinate.

Each of the four memory addresses can be based on the pixel coordinate and one or more offset values. For example, the tensor traversal unit can determine a first partial address value and a second partial address value that are used to determine each of the four memory addresses. Similar to the nearest neighbor implementation described above, the first partial address value can be based on the horizontal coordinate and the size of a third dimension (e.g., the z dimension). As the horizontal coordinate may include a fractional portion, the value of the horizontal coordinate can be rounded. For example, the tensor traversal unit can round the horizontal coordinate using a floor function that outputs the greatest integer that is less than or equal to the horizontal coordinate. The first partial address value can be based on the product of the rounded horizontal coordinate and the size of the third dimension. For an image, the size of the z dimension is one, so the first partial address value is equal to the rounded value of the horizontal coordinate.

Similarly, the second partial address value can be based on the vertical coordinate and a product of the size of the horizontal dimension and the size of the third dimension. As the vertical coordinate may also include a fractional portion, the value of the vertical coordinate can also be rounded, e.g., using the floor function. The second partial address value can be based on the product of the rounded vertical coordinate and the product of the size of the horizontal dimension and the size of the third dimension. For an image, the size of the z dimension is one, so the second partial address value is equal to the product of the rounded value of the vertical coordinate and the size of the horizontal dimension.

The tensor traversal unit can use a loop nest to determine the four memory addresses based on the first partial address value and the second partial address value. For example, the following loop nest can be used:

```
for (offset_y = 0; offset_y <= size_xz);
    offset_y += size_xz);
    for (offset_x = 0; offset_x <= size_z);
        offset_x += size_z;
        memory address = (first partial address value + second partial address value + offset_y + offset_x).
```

In this example loop nest, offset_y is the vertical offset value and offset_x is the horizontal offset value. In addition, size_xz is the product of the size of the horizontal dimension and the size of the third dimension (e.g., the size of the horizontal dimension when the third dimension has a size of one) and size_z is the size of the third dimension. The loop nest will produce four memory addresses: (1) first partial address value+second partial address value+0+0; (2) first partial address value+second partial address value+0+size_z; (3) first partial address value+second partial address value+size_xz+0; and (4) first partial address value+second partial address value+size_xz+size_x). This loop nest can be nested within the loops for determining the pixel coordinates described above for bilinear interpolation implementations to determine the four memory addresses for the four pixel values.

The system determines a respective weight for each of the four source pixels (512). The weight for each source pixel can be determined based on the fractional portion of current value of the horizontal coordinate and/or the fractional portion of the current value of the vertical coordinate. A loop nest can be used to determine the weights using the fractional portions. The loop nest can be performed in parallel with the loop nest used to determine the memory addresses. In this way, the tensor traversal unit can output the memory address for accessing a pixel value and the weight that corresponds to the pixel value either together or in succession so that, once the processing unit has the pixel value and weight for all four source pixels, the processing unit can use the pixel values and the weights to generate the pixel value for the transformed pixel for input to the machine learning model. The following loop nest can be used to determine the weights.

```
for (coord_y = intitial_y; coord_y <= size_y − 1);
    coord_y += stride_y;
    for (coord_x = initial_x; coord_x <= size_x − 1);
        coord_x += stride_x;
        for (yy = 0; yy<= 1);
            yy += 1;
            for (xx = 0; xx<= 1);
                xx += 1;
                if (xx == 0 & yy == 0);
                    weight_x = 1 − fractional_portion (coord_x);
                    weight_y = 1 − fractional_portion (coord_y);
                if (xx == 1 & yy == 0);
                    weight_x = fractional_portion (coord_x);
                    weight_y = 1 − fractional_portion (coord_y);
                if (xx == 0 & yy == 1);
                    weight_x = 1 − fractional_portion (coord_x);
                    weight_y = fractional_portion (coord_y);
                if (xx == 1 & yy == 1);
                    weight_x = fractional_portion (coord_x);
                    weight_y = fractional_portion (coord_y);
```

In this example, the outer loops for determining the horizontal coordinate (coord_x) and the vertical coord (coord_y) use the same loop bounds (size_y−1 and size_y−1) and loop indices (coord_y and coord_x) as the loop nest used to determine the memory addresses above. This ensures that four weights are determined for each transformed pixel coordinate of the transformed version of the image.

Two inner loops for yy and xx are used to determine the four weights based on the index values of the two inner loops. The loop for yy will iterate twice (once for yy=0 and once for yy=1). Similarly, the loop for xx will iterate twice (once for xx=0 and once for xx=1). Thus, the four states of the inner loops for each transformed pixel coordinate will be (xx=0, yy=0), (xx=1, yy=0), (xx=0, yy=1), and (xx=1, yy=1). A different weight is determined for each state and the weight for each state corresponds to the pixel within the input image for which the weight will be applied to its pixel value.

In this example, the first state (xx=0, yy=0) is used to determine the weights for the lower-left source pixel that is below and to the left of the location of the pixel coordinate. The weights for the lower-left source pixel includes a horizontal weight that is equal to one minus the fractional portion of the current value of the horizontal coordinate and a vertical weight that is equal to one minus the fractional portion of the current value of the vertical coordinate.

The second state (xx=1, yy=0) is used to determine the weights for the lower-right source pixel that is below and to the right of the location of the pixel coordinate. The weights for the lower-right source pixel includes a horizontal weight that is equal to the fractional portion of the current value of the horizontal coordinate and a vertical weight that is equal to one minus the fractional portion of the current value of the vertical coordinate.

The third state (xx=0, yy=1) is used to determine the weights for the upper-left source pixel that is above and to the left of the location of the pixel coordinate. The weights for the upper-left source pixel includes a horizontal weight that is equal to one minus the fractional portion of the current value of the horizontal coordinate and a vertical weight that is equal to the fractional portion of the current value of the vertical coordinate.

The fourth state (xx=1, yy=1) is used to determine the weights for the upper-right source pixel that is above and to the right of the location of the pixel coordinate. The weights for the upper-right source pixel includes a horizontal weight that is equal to the fractional portion of the current value of the horizontal coordinate and a vertical weight that is equal to the fractional portion of the current value of the vertical coordinate.

Using these computations, the horizontal weight for each source pixel is inversely proportional to the horizontal distance between the source pixel and the current horizontal coordinate of the pixel coordinate. Similarly, the vertical weight for each source pixel is inversely proportional to the vertical distance between the source pixel and the current vertical coordinate of the pixel coordinate.

The tensor traversal unit outputs the four weights for a pixel coordinate to the processing unit. The processing unit can then determine a pixel value for the transformed pixel that corresponds to the pixel coordinate defined by the current value of the horizontal coordinate and the current value of the value of the vertical coordinate using the pixel value for each source pixel and its corresponding weights.

For example, the processing unit can determine the pixel value for the transformed coordinate using relationship 5 below:

$$\text{pixel\_value} = ((\text{weight}_{x0,y0} * \text{pixel\_value}_{x0,y0}) + \\ (\text{weight}_{x1,y0} * \text{pixel\_value}_{x1,y0}) + \\ (\text{weight}_{x0,y1} * \text{pixel\_value}_{x0,y1}) + \\ (\text{weight}_{x1,y1} * \text{pixel\_value}_{x1,y1})) \quad (5)$$

In relationship 5, $\text{pixel\_value}_{x0,y0}$ is the pixel value of the lower-left source pixel and $\text{weight}_{x0,y0}$ is the product of the horizontal weight for the lower-left source pixel and the vertical weight for the lower-left source pixel. Similarly, $\text{pixel\_value}_{x1,y0}$ is the pixel value of the lower-right source pixel and $\text{weight}_{x0,y0}$ is the product of the horizontal weight for the lower-right source pixel and the vertical weight for the lower-right source pixel; $\text{pixel\_value}_{x0,y1}$ is the pixel value of the upper-left source pixel and $\text{weight}_{x0,y1}$ is the product of the horizontal weight for the upper-left source pixel and the vertical weight for the upper-right source pixel; and $\text{pixel\_value}_{x1,y1}$ is the pixel value of the upper-right source pixel and $\text{weight}_{x1,y1}$ is the product of the horizontal weight for the upper-right source pixel and the vertical weight for the upper-right source pixel.

The processing unit can determine the pixel value for each transformed pixel of the transformed version of the input image using relationship 5. When greyscale values are used to represent the color of each pixel, the processing unit can determine a single greyscale pixel value for each pixel using relationship 5. When RBG values are used to represent the color of each pixel, the processing unit can use relationship 5 to determine the value for each RGB color of the pixel separately. The weights for each color value would be the same. For example, the processing unit can use relationship 5 to determine the red value for the transformed pixel using the weights and the red value for each of the four source pixels. The processing unit can also use relationship 5 to determine the blue value for the transformed pixel using the weights and the blue value for each source pixel and use relationship 5 to determine the green value for the transformed pixel using the weights and the green value for each source pixel.

The processing unit can then provide the pixel values as inputs to a machine learning model that is configured to process images having the same shape as the transformed version of the image. The output of the machine learning model can be a classification of the input image using the transformed version of the input image.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:
1. A system, comprising:
a processing unit configured to perform machine learning computations for images using a machine learning model and pixel values for the images, wherein the machine learning model is configured to process images having particular dimensions;
a storage medium configured to store the pixel values for the images; and
a memory address computation unit that includes one or more hardware processors configured to:
receive image data for an image to be processed as input by the machine learning model;
traverse each pixel of a transformed version of the image in a sequence, wherein the transformed version of the image has dimensions that match the particular dimensions, the traversing including:
determining an initial pixel coordinate of an initial pixel of the transformed version of the image;
determining, based on a horizontal dimension of the image and a horizontal dimension of the particular dimensions for which the machine learning model is configured to process images, a horizontal pixel stride;
determining, based on a vertical dimension of the image and a vertical dimension of the particular dimensions for which the machine learning model is configured to process images, a vertical pixel stride;

determining one or more memory addresses, in the storage medium, for storing one or more pixel values of the initial pixel based on an initial vertical coordinate and an initial horizontal coordinate of the initial pixel coordinate;

for each other pixel of the transformed version of the image:
determining an updated pixel coordinate for the pixel based on a previous pixel coordinate of a previous pixel for which one or more memory addresses were determined and at least one of the vertical pixel stride or the horizontal pixel stride; and determining one or more memory addresses, in the storage medium, for storing one or more pixel values of the pixel based on an updated vertical coordinate and an updated horizontal coordinate of the updated pixel coordinate; and output the memory address for each pixel value of each pixel of the transformed version of the image to the processing unit, wherein the processing unit uses each memory address to obtain the pixel value stored in memory at the memory address and performs one or more machine learning computations using the obtained pixel value.

2. The system of claim 1, wherein the one or more hardware processors are further configured to:

determine that dimensions of the image do not match the particular dimensions of images that the machine learning model is configured to process; and in response to determining that the dimensions of the image do not match the particular dimensions, determine memory addresses for storing one or more pixel values for each pixel of the transformed version of the image.

3. The system of claim 1, wherein determining an updated pixel coordinate for the pixel based on a previous pixel coordinate of a previous pixel for which one memory addresses were determined and at least one of the vertical pixel stride or the horizontal pixel stride comprises at least one of (i) determining the updated vertical coordinate by adding the vertical pixel stride to a previous vertical coordinate of the previous pixel coordinate or (ii) determining the updated horizontal coordinate by adding the horizontal pixel stride to a previous horizontal coordinate of the previous pixel coordinate.

4. The system of claim 3, wherein determining an updated pixel coordinate for the pixel based on a previous pixel coordinate of a previous pixel for which one memory addresses were determined and at least one of the vertical pixel stride or the horizontal pixel stride comprises:

determining the updated horizontal coordinate for each iteration of a first loop used to traverse a horizontal dimension of the image by adding the horizontal pixel stride to the previous horizontal coordinate after each iteration of the first loop; and determining the updated vertical coordinate for each iteration of a second loop used to traverse a vertical dimension of the image by adding the vertical pixel stride to the previous vertical coordinate after each iteration of the second loop.

5. The system of claim 1, wherein the determined memory address for each pixel coordinate corresponds to a location in the storage medium for storing a pixel value for a nearest neighbor pixel for the pixel coordinate, and wherein the pixel value at each nearest neighbor pixel is used by the processing unit as an input to the machine learning model.

6. The system of claim 1, wherein determining one or more memory addresses, in the storage medium, for storing one or more pixel values of the pixel based on an updated vertical coordinate and an updated horizontal coordinate of the updated pixel coordinate comprises:

determining a first partial address value based on a product of the updated horizontal coordinate and a first dimension multiplier;

determining a second partial address value based on a product of the updated vertical coordinate and a second dimension multiplier; and determining a memory address for the updated pixel coordinate by determining a sum of the first partial address value and the second partial address value.

7. The system of claim 6, wherein the memory address for the updated pixel equals the sum of the first partial address value, the second partial address value, and a base memory address.

8. The system of claim 1, wherein determining one or more memory addresses, in the storage medium, for storing one or more pixel values of the pixel based on an updated vertical coordinate and an updated horizontal coordinate of the updated pixel coordinate comprises determining a respective memory address for each of four pixel coordinates for use in bilinear interpolation of a pixel value for the updated pixel coordinate, including:

identifying a vertical offset value;
identifying a horizontal offset value;

determining, for a first pixel coordinate of the four pixel coordinates, a first memory address for storing a first pixel value for the first pixel coordinate based on a sum of the updated horizontal coordinate and the updated vertical coordinate;

determining, for a second pixel coordinate of the four pixel coordinates, a second memory address for storing a second pixel value the second pixel coordinate based on a sum of the updated horizontal coordinate, the updated vertical coordinate, and the vertical offset value;

determining, for a third pixel coordinate of the four pixel coordinates, a third memory address for storing a third pixel value for the third pixel coordinate based on a sum of the updated horizontal coordinate, the updated vertical coordinate, and the horizontal offset value; and determining, for a fourth pixel coordinate of the four pixel coordinates, a fourth memory address for storing a fourth pixel value for the fourth pixel coordinate based on a sum of the updated horizontal coordinate, the updated vertical coordinate, the vertical offset value, and the horizontal offset value.

9. The system of claim 8, wherein:

the one or more processors determines a bilinear interpolation weight for each of the four pixel coordinates and outputs each weight to the processing unit; and the processing unit determines an input pixel value for the machine learning model using the pixel value at each of the four pixel coordinates and the weight for each of the four pixel coordinates.

10. The system of claim 9, wherein the weight for each of the four pixel coordinates is based on a fractional portion of the updated horizontal coordinate and a fractional portion of the updated vertical coordinate.

11. A method performed by one or more hardware processors, the method comprising:

receiving image data for an image to be processed as input by a machine learning model that is configured to process images having particular dimensions;

traversing each pixel of a transformed version of the image in a sequence, wherein the transformed version of the image has dimensions that match the particular dimensions, the traversing including:

determining an initial pixel coordinate of an initial pixel of the transformed version of the image;

determining, based on a horizontal dimension of the image and a horizontal dimension of the particular dimensions for which the machine learning model is configured to process images, a horizontal pixel stride;

determining, based on a vertical dimension of the image and a vertical dimension of the particular dimensions for which the machine learning model is configured to process images, a vertical pixel stride;

determining one or more memory addresses, in a storage medium, for storing one or more pixel values of the initial pixel based on an initial vertical coordinate and an initial horizontal coordinate of the initial pixel coordinate;

for each other pixel of the transformed version of the image:

determining an updated pixel coordinate for the pixel based on a previous pixel coordinate of a previous pixel for which one or more memory addresses were determined and at least one of a vertical pixel stride or a horizontal pixel stride; and determining one or more memory addresses, in the storage medium, for storing one or more pixel values of the pixel based on an updated vertical coordinate and an updated horizontal coordinate of the updated pixel coordinate; and outputting the memory address for each pixel value of each pixel of the transformed version of the image to a processing unit, wherein the processing unit uses each memory address to obtain the pixel value stored in memory at the memory address and performs one or more machine learning computations using the obtained pixel value.

12. The method of claim 11, further comprising:

determining that dimensions of the image do not match the particular dimensions of images that the machine learning model is configured to process; and in response to determining that the dimensions of the image do not match the particular dimensions, determining memory addresses for storing one or more pixel values for each pixel of the transformed version of the image.

13. The method of claim 11, wherein determining an updated pixel coordinate for the pixel based on a previous pixel coordinate of a previous pixel for which one memory addresses were determined and at least one of the vertical pixel stride or the horizontal pixel stride comprises at least one of (i) determining the updated vertical coordinate by adding the vertical pixel stride to a previous vertical coordinate of the previous pixel coordinate or (ii) determining the updated horizontal coordinate by adding the horizontal pixel stride to a previous horizontal coordinate of the previous pixel coordinate.

14. The method of claim 13, wherein determining an updated pixel coordinate for the pixel based on a previous pixel coordinate of a previous pixel for which one memory addresses were determined and at least one of the vertical pixel stride or the horizontal pixel stride comprises:

determining the updated horizontal coordinate for each iteration of a first loop used to traverse a horizontal dimension of the image by adding the horizontal pixel stride to the previous horizontal coordinate after each iteration of the first loop; and determining the updated vertical coordinate for each iteration of a second loop used to traverse a vertical dimension of the image by adding the vertical pixel stride to the previous vertical coordinate after each iteration of the second loop.

15. The method of claim 11, wherein the determined memory address for each pixel coordinate corresponds to a location in a storage medium for storing a pixel value for a nearest neighbor pixel for the pixel coordinate, and wherein the pixel value at each nearest neighbor pixel is used as an input to the machine learning model.

16. The method of claim 11, wherein determining one or more memory addresses, in the storage medium, for storing one or more pixel values of the pixel based on an updated vertical coordinate and an updated horizontal coordinate of the updated pixel coordinate comprises:

determining a first partial address value based on a product of the updated horizontal coordinate and a first dimension multiplier;

determining a second partial address value based on a product of the updated vertical coordinate and a second dimension multiplier; and determining a memory address for the updated pixel coordinate by determining a sum of the first partial address value and the second partial address value.

17. The method of claim 16, wherein the memory address for the updated pixel equals the sum of the first partial address value, the second partial address value, and a base memory address.

18. An apparatus, comprising:

one or more first hardware storage circuits for storing a current value of a horizontal coordinate for an image; and one or more second hardware storage circuits for storing a current value of a vertical coordinate for an image to be processed as input by a machine learning model that is configured to process images having particular dimensions;

a storage medium configured to store pixel values for images; and one or more hardware processors configured to:

receive image data for an image to be processed as input by the machine learning model;

traverse each pixel of a transformed version of the image in a sequence, wherein the transformed version of the image has dimensions that match the particular dimensions, the traversing including:

determining an initial pixel coordinate of an initial pixel of the transformed version of the image;

determining, based on a horizontal dimension of the image and a horizontal dimension of the particular dimensions for which the machine learning model is configured to process images, a horizontal pixel stride;

determining, based on a vertical dimension of the image and a vertical dimension of the particular dimensions for which the machine learning model is configured to process images, a vertical pixel stride;

determining one or more memory addresses, in the storage medium, for storing one or more pixel values of the initial pixel based on an initial vertical coordinate and an initial horizontal coordinate of the initial pixel coordinate;

for each other pixel of the transformed version of the image:

determining an updated pixel coordinate for the pixel based on a previous pixel coordinate of a previous pixel for which one or more memory addresses were determined and at least one of a vertical pixel stride or a horizontal pixel stride; and determining one or more memory addresses, in the storage medium, for storing one or more pixel values of the pixel based on an updated vertical coordinate and an updated horizontal coordinate of the updated pixel coordinate; and output the memory address for each pixel value of each pixel of the transformed version of the image to a processing unit, wherein the processing unit uses each memory address to obtain the pixel value stored in memory at the memory address and performs one or more machine learning computations using the obtained pixel value.

19. The system of claim 1, wherein:

determining the horizontal pixel stride comprises determining a first quotient by dividing a first sum of the horizontal dimension of the image and a constant by a second sum of the horizontal dimension of the particular dimensions; and determining the vertical pixel stride comprises determining a second quotient by dividing a third sum of the vertical dimension of the image and the constant by a fourth sum of the vertical dimension of the particular dimensions.

20. The system of claim 1, wherein:

the one or more hardware processors determine a bilinear interpolation weight for each of four pixel coordinates and outputs each weight to the processing unit; and the processing unit determines an input pixel value for the machine learning model using a pixel value at each of the four pixel coordinates and the weight for each of the four pixel coordinates.

* * * * *

UNITED STATES PATENT AND TRADEMARK OFFICE
CERTIFICATE OF CORRECTION

| | |
|---|---|
| PATENT NO. | : 11,170,469 B2 |
| APPLICATION NO. | : 16/531876 |
| DATED | : November 9, 2021 |
| INVENTOR(S) | : Carrell Daniel Killebrew, Ravi Narayanaswami and Dong Hyuk Woo |

It is certified that error appears in the above-identified patent and that said Letters Patent is hereby corrected as shown below:

In the Specification

Column 2, Line 43, in the "summary" section: Please delete "the first second" and insert --the second--, therefor.

Column 3, Line 37, in the "summary" section: Please delete "value the" and insert --value for the--, therefor.

In the Claims

Column 24, Line 39, in Claim 8: Please delete "value the" and insert --value for the--, therefor.

Signed and Sealed this
Sixteenth Day of May, 2023

Katherine Kelly Vidal
*Director of the United States Patent and Trademark Office*